United States Patent
Riefenstein

(10) Patent No.: US 9,538,880 B2
(45) Date of Patent: Jan. 10, 2017

(54) OPTICAL QUALITY CONTROL SYSTEM

(71) Applicant: Convotherm Elektrogeraete GMBH, Eglfing (DE)

(72) Inventor: Lutz Riefenstein, Welheim (DE)

(73) Assignee: CONVOTHERM ELEKTROGERAETE GMBH, Eglfing (DE)

( * ) Notice: Subject to any disclaimer, the term of this patent is extended or adjusted under 35 U.S.C. 154(b) by 180 days.

(21) Appl. No.: 13/886,999

(22) Filed: May 3, 2013

(65) Prior Publication Data
US 2013/0302483 A1   Nov. 14, 2013

Related U.S. Application Data

(60) Provisional application No. 61/604,805, filed on May 9, 2012, provisional application No. 61/644,820, filed on May 9, 2012.

(51) Int. Cl.
*A47J 37/12*   (2006.01)
*A47J 36/00*   (2006.01)
(Continued)

(52) U.S. Cl.
CPC .............. *A47J 36/00* (2013.01); *F24C 7/085* (2013.01); *G06K 9/6201* (2013.01);
(Continued)

(58) Field of Classification Search
CPC ............ A47J 27/62; A47J 43/00; A47J 44/00; A47J 31/545; A47J 36/00; G01N 21/00; G01N 21/01; G01B 11/14; G06K 9/6201; F24C 7/085; H05B 6/687; H05B 6/6435; H05B 6/6447; G06N 5/04; G06N 99/005; G06N 3/08; G06N 7/00; G06F 17/00; G06Q 50/12
(Continued)

(56) References Cited

U.S. PATENT DOCUMENTS 3,827,345 A * 8/1974 Willson .......................... 99/325
3,999,040 A * 12/1976 Ellis .............................. 219/543
(Continued)

FOREIGN PATENT DOCUMENTS

DE   102005040206 A1   2/2007
DE   102008031378 A1   1/2009
(Continued)

OTHER PUBLICATIONS

Extended European Search Report dated Feb. 7, 2014 for European application No. 13002456.5.
(Continued)

*Primary Examiner* — Eric Stapleton
(74) *Attorney, Agent, or Firm* — Ohlandt, Greeley, Ruggiero & Perle, LLP

(57) ABSTRACT

Disclosed are cooking devices having inspection systems including: a distance sensor and a digital optical recognition device. The distance sensor detects the position of the food product placed in the cooking device and the digital optical recognition device captures a series of images for the purpose of food product recognition. Once the food product is recognized, the operator is provided with the correct cooking cycle/program for the position and type of food product placed in the cooking device. The inspection systems also ensure that the food product has been properly cooked at the end of the cooking cycle/program. The inspection systems ensure: (1) the food product is correctly recognized; (2) the cooking cycle/program is correctly selected; (3) the correct cooking cycle/program is followed to completion and (4) the quality of the cooked food product meets expected standards.

12 Claims, 7 Drawing Sheets

(51) Int. Cl.
  *G06K 9/62* (2006.01)
  *H05B 6/64* (2006.01)
  *H05B 6/68* (2006.01)
  *F24C 7/08* (2006.01)

(52) U.S. Cl.
  CPC .......... *H05B 6/6435* (2013.01); *H05B 6/687* (2013.01); *H05B 6/6447* (2013.01)

(58) Field of Classification Search
  USPC  99/324–326, 334, 341; 382/111; 422/82.05;
    392/480; 73/653, 655, 862.324,
    73/862.624, 54.08, 1.79, 490; 219/502;
    16/22, 16/27, 89; 356/3, 4.06, 4.07, 482,
    486, 492, 356/493, 498; 706/20, 22, 25,
    31, 45–48, 706/50–52, 61
  See application file for complete search history.

(56) References Cited

U.S. PATENT DOCUMENTS

| | | | |
|---|---|---|---|
| 4,354,153 A * | 10/1982 | Lentz | 324/95 |
| 4,459,449 A * | 7/1984 | Hirata | 219/720 |
| 4,499,357 A * | 2/1985 | Kojima | 219/711 |
| 4,505,194 A * | 3/1985 | Bishop et al. | 99/336 |
| 4,568,927 A * | 2/1986 | Fowler | 345/184 |
| 4,628,439 A * | 12/1986 | Fowler et al. | 700/9 |
| 4,742,455 A * | 5/1988 | Schreyer | 700/90 |
| 4,780,588 A * | 10/1988 | Edamura | 219/714 |
| 4,831,239 A * | 5/1989 | Ueda | 219/518 |
| 4,833,304 A | 5/1989 | Ueda | |
| 4,922,435 A * | 5/1990 | Cahlander et al. | 700/247 |
| 4,972,060 A * | 11/1990 | Edamura | 219/714 |
| 5,183,984 A * | 2/1993 | Nakagawa | 219/720 |
| 5,221,817 A * | 6/1993 | Ota | 219/720 |
| 5,249,510 A * | 10/1993 | Rozak et al. | 99/336 |
| 5,275,090 A * | 1/1994 | Connell | 99/336 |
| 5,278,921 A * | 1/1994 | Nakamura et al. | 382/167 |
| 5,293,019 A * | 3/1994 | Lee | 219/708 |
| 5,315,919 A * | 5/1994 | Hoeberigs | 99/357 |
| 5,357,426 A * | 10/1994 | Morita et al. | 700/90 |
| 5,361,681 A * | 11/1994 | Hedstrom et al. | 99/331 |
| 5,386,762 A * | 2/1995 | Gokey | 99/326 |
| 5,426,280 A * | 6/1995 | Smith | 219/506 |
| 5,445,073 A * | 8/1995 | Gilwood | 99/427 |
| 5,539,187 A * | 7/1996 | Smith et al. | 219/681 |
| 5,746,114 A * | 5/1998 | Harris | 99/331 |
| 5,818,014 A * | 10/1998 | Smith et al. | 219/679 |
| 5,832,446 A * | 11/1998 | Neuhaus | 705/15 |
| 5,868,064 A * | 2/1999 | Ubert et al. | 99/427 |
| 5,893,051 A * | 4/1999 | Tomohiro | 702/130 |
| 5,986,249 A * | 11/1999 | Yoshino et al. | 219/746 |
| 6,133,555 A * | 10/2000 | Brenn | 219/497 |
| 6,204,491 B1 * | 3/2001 | Montani | 219/679 |
| 6,232,585 B1 * | 5/2001 | Clothier et al. | 219/620 |
| 6,274,859 B1 * | 8/2001 | Yoshino et al. | 219/746 |
| 6,299,920 B1 * | 10/2001 | Saksena | 426/231 |
| 6,301,564 B1 * | 10/2001 | Halverson | 705/15 |
| 6,374,154 B1 * | 4/2002 | Cavens | 700/231 |
| 6,481,602 B1 * | 11/2002 | Fritze et al. | 222/564 |
| 6,574,603 B1 * | 6/2003 | Dickson et al. | 705/15 |
| 6,583,723 B2 * | 6/2003 | Watanabe et al. | 340/573.1 |
| 6,586,714 B2 * | 7/2003 | Kawamura et al. | 219/711 |
| 6,587,739 B1 * | 7/2003 | Abrams et al. | 700/83 |
| 6,774,345 B1 * | 8/2004 | Kenk | 219/506 |
| 6,792,323 B2 * | 9/2004 | Krzyzanowski et al. | 700/90 |
| 6,817,757 B1 * | 11/2004 | Wallace | 374/120 |
| 6,842,719 B1 * | 1/2005 | Fitzpatrick et al. | 702/182 |
| 6,869,633 B2 * | 3/2005 | Sus et al. | 426/438 |
| 6,871,676 B2 * | 3/2005 | Sus et al. | 141/83 |
| 6,960,157 B2 * | 11/2005 | Schackmuth et al. | 493/55 |
| 6,963,657 B1 * | 11/2005 | Nishigaki et al. | 382/106 |
| 7,009,519 B2 * | 3/2006 | Leonard et al. | 340/572.8 |
| 7,026,929 B1 * | 4/2006 | Wallace | 340/539.13 |
| 7,043,442 B2 * | 5/2006 | Levy et al. | 705/346 |
| 7,080,593 B1 * | 7/2006 | Frankel | 99/326 |
| 7,096,221 B2 * | 8/2006 | Nakano | 340/6.1 |
| 7,104,184 B2 * | 9/2006 | Biderman et al. | 99/282 |
| 7,133,739 B2 * | 11/2006 | Williamson et al. | 700/207 |
| 7,151,968 B2 * | 12/2006 | Williamson | 700/65 |
| 7,174,830 B1 * | 2/2007 | Dong | 99/334 |
| 7,183,518 B2 * | 2/2007 | Near et al. | 219/214 |
| 7,201,099 B2 * | 4/2007 | Harris et al. | 99/342 |
| 7,207,486 B1 * | 4/2007 | Bennett | 235/385 |
| 7,235,763 B2 * | 6/2007 | Christiaansen et al. | 219/681 |
| 7,258,881 B2 * | 8/2007 | Jones et al. | 426/233 |
| 7,303,776 B2 * | 12/2007 | Sus et al. | 426/413 |
| 7,304,275 B2 * | 12/2007 | Chun et al. | 219/506 |
| 7,326,888 B2 * | 2/2008 | Chun et al. | 219/506 |
| 7,340,414 B2 * | 3/2008 | Roh et al. | 705/23 |
| 7,343,719 B2 * | 3/2008 | Sus et al. | 53/127 |
| 7,361,866 B2 * | 4/2008 | Chun | 219/506 |
| 7,388,180 B2 * | 6/2008 | Kim et al. | 219/749 |
| 7,392,155 B2 * | 6/2008 | Fujii et al. | 702/158 |
| 7,396,675 B2 * | 7/2008 | Pawlak et al. | 435/287.2 |
| 7,409,311 B2 * | 8/2008 | Imgram et al. | 702/132 |
| 7,441,388 B2 * | 10/2008 | Sus et al. | 53/475 |
| 7,445,938 B2 * | 11/2008 | Angeley | 436/164 |
| 7,454,390 B2 * | 11/2008 | Nagamitsu et al. | 706/45 |
| 7,520,244 B2 * | 4/2009 | Yamagishi et al. | 118/723 E |
| 7,521,769 B2 * | 4/2009 | Cunningham | 257/414 |
| 7,535,002 B2 * | 5/2009 | Johnson et al. | 250/332 |
| 7,538,326 B2 * | 5/2009 | Johnson et al. | 250/370.08 |
| 7,612,315 B2 * | 11/2009 | Corradini | 219/401 |
| 7,626,468 B2 * | 12/2009 | Staines | 331/96 |
| 7,680,691 B2 * | 3/2010 | Kimball et al. | 705/22 |
| 7,698,946 B2 * | 4/2010 | Clarke et al. | 73/601 |
| 7,703,389 B2 * | 4/2010 | McLemore et al. | 99/413 |
| 7,727,775 B2 * | 6/2010 | Willson et al. | 436/518 |
| 7,738,678 B2 * | 6/2010 | Breed et al. | 382/100 |
| 7,877,291 B2 * | 1/2011 | Koether et al. | 705/15 |
| 7,933,733 B2 * | 4/2011 | Ashrafzadeh et al. | 702/116 |
| 7,937,289 B2 * | 5/2011 | Bodin et al. | 705/22 |
| 7,983,817 B2 * | 7/2011 | Breed | 701/45 |
| 8,032,430 B2 * | 10/2011 | Bodin et al. | 705/28 |
| 8,060,408 B2 * | 11/2011 | Koether et al. | 705/15 |
| 8,191,465 B2 * | 6/2012 | Sager et al. | 99/332 |
| 8,284,056 B2 * | 10/2012 | McTigue | 340/572.1 |
| 8,371,285 B2 * | 2/2013 | Wiker et al. | 126/21 A |
| 8,379,302 B2 * | 2/2013 | Kuhlman et al. | 359/358 |
| 8,492,686 B2 * | 7/2013 | Bilchinsky et al. | 219/678 |
| 8,514,084 B2 * | 8/2013 | Yi | 340/573.1 |
| 8,531,562 B2 * | 9/2013 | Schmidt et al. | 348/262 |
| 8,563,059 B2 * | 10/2013 | Luckhardt et al. | 426/233 |
| 8,712,851 B2 * | 4/2014 | Koether et al. | 705/15 |
| 2001/0002674 A1 * | 6/2001 | Gubbini et al. | 221/13 |
| 2002/0026325 A1 * | 2/2002 | Hirahara et al. | 705/1 |
| 2002/0070861 A1 * | 6/2002 | Teller | 340/572.1 |
| 2002/0082924 A1 * | 6/2002 | Koether | 705/15 |
| 2002/0171674 A1 * | 11/2002 | Paris | 345/700 |
| 2003/0037681 A1 * | 2/2003 | Zhu et al. | 99/325 |
| 2003/0133840 A1 * | 7/2003 | Coombs et al. | 422/82.05 |
| 2003/0183972 A1 * | 10/2003 | Weber et al. | 264/85 |
| 2004/0099144 A1 * | 5/2004 | Kudo et al. | 99/325 |
| 2004/0106211 A1 * | 6/2004 | Kauer et al. | 436/169 |
| 2004/0260513 A1 * | 12/2004 | Fitzpatrick et al. | 702/182 |
| 2005/0046584 A1 * | 3/2005 | Breed | 340/825.72 |
| 2005/0193901 A1 * | 9/2005 | Buehler | 99/468 |
| 2006/0010037 A1 * | 1/2006 | Angert et al. | 705/15 |
| 2006/0020486 A1 * | 1/2006 | Kurzweil et al. | 705/1 |
| 2006/0114116 A1 * | 6/2006 | Mullet et al. | 340/679 |
| 2006/0179022 A1 * | 8/2006 | Holland | 706/45 |
| 2006/0218057 A1 * | 9/2006 | Fitzpatrick et al. | 705/28 |
| 2006/0232383 A1 * | 10/2006 | Yoon et al. | 340/10.2 |
| 2006/0259372 A1 * | 11/2006 | Perrier et al. | 705/26 |
| 2006/0278093 A1 * | 12/2006 | Biderman et al. | 99/282 |
| 2006/0278710 A1 * | 12/2006 | Park et al. | 235/462.15 |
| 2007/0001012 A1 * | 1/2007 | Kim et al. | 235/462.13 |
| 2007/0007279 A1 * | 1/2007 | Chun et al. | 219/506 |
| 2007/0039940 A1 * | 2/2007 | Kim et al. | 219/217 |
| 2007/0088624 A1 * | 4/2007 | Vaughn et al. | 705/26 |
| 2007/0114224 A1 * | 5/2007 | Nagamitsu et al. | 219/490 |
| 2007/0137633 A1 * | 6/2007 | McFadden | 126/21 A |
| 2007/0215608 A1 * | 9/2007 | Yoshino et al. | 219/681 |

(56) References Cited

U.S. PATENT DOCUMENTS

| | | | |
|---|---|---|---|
| 2007/0215612 A1* | 9/2007 | Hicks et al. | 219/746 |
| 2007/0246453 A1* | 10/2007 | Nam et al. | 219/413 |
| 2007/0251521 A1* | 11/2007 | Schackmuth et al. | 126/369 |
| 2007/0254080 A1* | 11/2007 | Schackmuth et al. | 426/523 |
| 2008/0047959 A1* | 2/2008 | Moriya et al. | 219/745 |
| 2008/0078229 A1* | 4/2008 | Mancevski et al. | 73/1.79 |
| 2008/0088853 A1* | 4/2008 | Hwang et al. | 356/498 |
| 2008/0105675 A1* | 5/2008 | Choi et al. | 219/749 |
| 2008/0160967 A1* | 7/2008 | Narasimhan et al. | 455/414.1 |
| 2008/0181821 A1* | 7/2008 | Jung et al. | 422/82.02 |
| 2008/0193614 A1* | 8/2008 | Greiner et al. | 426/231 |
| 2008/0206420 A1* | 8/2008 | McFadden | 426/523 |
| 2008/0256008 A1* | 10/2008 | Kwok | 706/20 |
| 2008/0264269 A1* | 10/2008 | Sterzel et al. | 99/331 |
| 2008/0280000 A1* | 11/2008 | Breunig et al. | 426/523 |
| 2008/0296284 A1* | 12/2008 | McFadden et al. | 219/400 |
| 2009/0071110 A1* | 3/2009 | Gonze et al. | 55/282.3 |
| 2009/0236334 A1* | 9/2009 | Ben-Shmuel et al. | 219/703 |
| 2009/0265216 A1* | 10/2009 | Flynn et al. | 705/10 |
| 2009/0274802 A1* | 11/2009 | Kling et al. | 426/231 |
| 2009/0293733 A1* | 12/2009 | Martin et al. | 99/280 |
| 2010/0045705 A1* | 2/2010 | Vertegaal et al. | 345/661 |
| 2010/0123001 A1* | 5/2010 | Park | 235/375 |
| 2010/0145899 A1* | 6/2010 | Buehler | 706/47 |
| 2010/0155392 A1* | 6/2010 | Nordh et al. | 219/702 |
| 2010/0161431 A1* | 6/2010 | Koether et al. | 705/15 |
| 2010/0176121 A1* | 7/2010 | Nobue et al. | 219/716 |
| 2010/0237067 A1* | 9/2010 | Nordh et al. | 219/690 |
| 2010/0252551 A1* | 10/2010 | Nordh et al. | 219/702 |
| 2010/0321152 A1* | 12/2010 | Argudyaev et al. | 340/5.53 |
| 2010/0332571 A1* | 12/2010 | Healey et al. | 707/912 |
| 2011/0002677 A1* | 1/2011 | Cochran et al. | 392/416 |
| 2012/0095616 A1* | 4/2012 | Karlsson | 700/306 |
| 2013/0052616 A1* | 2/2013 | Silverstein et al. | 434/127 |
| 2013/0302483 A1* | 11/2013 | Riefenstein | 426/233 |
| 2014/0026762 A1* | 1/2014 | Riefenstein | 99/325 |

FOREIGN PATENT DOCUMENTS

| | | |
|---|---|---|
| DE | 202011002570 U1 | 5/2012 |
| EP | 1193584 A1 | 4/2002 |
| EP | 2149755 A1 | 2/2010 |
| JP | 2005140671 A | 6/2005 |
| WO | 0049838 A1 | 8/2000 |

OTHER PUBLICATIONS

European Search Report dated Nov. 12, 2013 for European application No. 13002456.5.
Extended European Office Action dated Nov. 27, 2014 for European application No. 14002370.6.
European Office Action dated Dec. 19, 2014 for European application No. 13002456.5.
Office Action dated Dec. 30, 2015 for corresponding Chinese patent application No. 201380034314.7, pp. 15.

* cited by examiner

OPTICAL QUALITY CONTROL SYSTEM

CROSS-REFERENCED APPLICATIONS

This application is related, and claims priority, to U.S. Provisional Application Nos. 61/604,805 and 61/644,820, both filed on May 9, 2012, that are incorporated herein in their entirety by reference thereto.

BACKGROUND

1. Field of the Disclosure

The present disclosure relates to cooking devices and methods of operating such cooking devices. In particular, the present disclosure relates to cooking devices for commercial use, especially a combi-steamer, a baking oven or a microwave oven, that include inspection systems and methods for ensuring that the food product to be cooked in the cooking device is cooked according to the proper cooking cycle/program for the type and placement of food product in the cooking device. Also, the present disclosure relates to inspection systems and methods that determine whether the cooked food product has been cooked properly and meets appropriate standards for the cooked food product.

2. Background of the Disclosure

EP 1 193 584 A1 discloses a microwave cooking device with a radio-frequency identification (RFID) (a wireless non-contact system that uses radio-frequency electromagnetic fields to transfer data from a tag attached to an object) sensor. The RFID sensor automatically identifies the food to be cooked via an RFID tag that is attached to the packaging. The cooking process can then run automatically.

WO 00/49838 A1 discloses a cooking device with a scanner. The scanner identifies a code or a symbol on the food packaging, whereupon an integrated microprocessor accesses cooking recipe data from a database.

U.S. Pat. No. 6,774,345 shows a cooking device with a bar code reader that is located at a front side of the cooking device. The bar code reader identifies the food by reading a bar code from the packaging of the food. After that, the cooking device permits or denies the cooking of the food.

U.S. Pat. Pub. 2007/0007279 shows a cooking device that reads the bar code from a packaging of the food to be cooked. The cooking device can be connected to an identification infrastructure in order to download further data for the food or for the cooking recipe.

DE 10 2005 040 206 A1 discloses a cooking device system and a procedure for cooking food, wherein an identifier for the food is provided. The identifier can have the form of a bar code reader or of an RFID sensor. Data for the food or for the cooking recipe can be accessed over the internet or from a local database.

U.S. Pat. Pub. 2002/0026325 discloses the control of a cooking procedure with data from a local network and from the internet. RFID tags are used for identifying the food.

DE 10 2008 031 378 A1 discloses a cooking device with a recognition system for the food via RFID tags, and with an automatic recognition of the tray rail in that the food to be cooked has been inserted.

EP 2 149 755 A1 discloses an oven and a method of operating the same. The oven of this document comprises a digital optical recognition device and a distance sensor that are used in concert to enable precise extraction of product-features that are relevant and used with automated heating procedures.

U.S. Pat. No. 5,361,681 discloses a cooking system including adjustable actuators to change cooking parameters, a television digital optical recognition device that monitors the cooking area and drives a processor associated with a memory device that has stored therein different cooking cycle/programs for different food products.

U.S. Pat. No. 7,454,390 discloses an ingredient cooking operation recognition system including a sensing section having an optical digital optical recognition device, a thermal digital optical recognition device, and a microphone for sensing environmental sound.

SUMMARY

The systems disclosed in the above references are quite complex and likely subject to frequent and expensive repairs and adjustments. Also, the above references do not reflect systems or methods that can serve to confirm that a cooking cycle/program has attained the quality of cooked product that is expected. Therefore, a simple and reliable device and method to ensure that food product is subject to the correct cooking cycle/program and that can monitor the quality of the cooked state of food product(s) is still needed. According to the present disclosure, such a simple and reliable system and method are provided.

It is an object of the present disclosure to provide inspection systems for a cooking device, in particular a commercial cooking device, as well as methods of operating the same that are technically simple, reliable and easy to handle for an operator.

It is also an object of the present disclosure to provide inspection systems for a cooking device, in particular a commercial cooking device, as well as methods of operating the same that provide the correct cooking cycle/program to the operator for the type and/or number of food product(s) placed in the cooking device.

It is further object of the present disclosure to provide inspection systems for a cooking device, in particular a commercial cooking device, as well as methods of operating the same that ensure that the operator of the cooking device is removing the correct food product from the cooking device after the cooking cycle/program has finished.

It is a still further object of the present disclosure to provide inspection systems for a cooking device, in particular a commercial cooking device, as well as methods of operating the same that analyze the quality of the state of cooked food product to determine whether the cooked food product has been cooked completely and meets appropriate standards for the cooked food product.

Employing a cooking device having inspection systems of the present disclosure serves to ensure that: (1) the food product is correctly recognized; (2) the cooking cycle/program is correctly selected for the given food product and placement of the food product in the cooking device; (3) the correct cooked food product is removed from the cooking device after the cooking cycle/program is finished and the cooking cycle/program is followed to completion; and (4) the quality of the cooked food product meets desired or expected standards.

The cooking device itself is of general, known design and, while the individual components of the inspection system may be known, they have not heretofore been combined or utilized in the manner disclosed herein.

The cooking device comprises inspection systems including: a distance sensor and a digital optical recognition device, wherein the digital optical recognition device captures a series of images of the food product to be cooked for the purposes of food product recognition and of the selection of cooking cycle/program, and the distance sensor detects the position of the food product placed in the cooking device. Once the food product is recognized, the operator of the cooking device is provided the correct cooking cycle/program for the type and quantity of food product placed in the cooking device. Once the cooking cycle/program is finished, the inspection system determines whether the correct cooked food product is being removed from the cooking device and, again through the digital optical recognition device capturing images of the cooked food product, whether the cooked food product meets parameters for the proper degree of cooking.

The inspection system of the present disclosure includes means, herein referred to as digital optical recognition device(s), for recognizing, analyzing and comparing the food product to be cooked and the quality of the state of cooked food product, by comparing images of the food product to be cooked and having been cooked to, preferably, a data base of stored images of similar or identical type(s) of food product and the quality of similar or identical properly cooked food product. The inspection system of the present disclosure serves to eliminate or greatly reduce cooking errors, and thus greatly helps to ensure that food product(s) are not served to the public in an undercooked, and potentially dangerous, state.

In one embodiment, the present disclosure provides a cooking device, in particular a commercial cooking device (such as, preferably, a combi-steamer, a baking oven or a microwave oven) comprising: a housing including a cooking chamber, a door for opening and closing the cooking chamber, and at least one mechanism for receiving and holding at least one food product carrier at a predetermined level. Associated with (either internally or externally) to the cooking chamber of the cooking device is an inspection system including a distance sensor and a digital optical recognition device. Either the distance sensor or the digital optical recognition device, or both, can be located inside or outside of the cooking chamber. Although in the description that follows, the distance sensor and the optical recognition device are described, for convenience sake, as located outside to the cooking device, it will become apparent based on the detailed description that follows that either of these devices or both may be located inside the cooking chamber. While the location inside the cooking chamber will likely entail some modifications to the distance sensor and or the digital optical recognition device if one or both of these are placed inside the cooking chamber (due to higher temperatures and/or higher humidity, for instance), such modifications are well within the ability of those of skill in the art.

The distance sensor detects the level of the placement of the food product carrier into the cooking device and/or being removed from the cooking device, and the digital optical recognition device captures a series of product images for the purpose(s) of food product and/or quality of cooking recognition. As part of the inspection system is a controller and associated memory, as well as optional components such as displays, lighting mechanisms, and the like that will be further explained in the disclosure that follows.

In another embodiment, the present disclosure relates to a method of operating a cooking device. According to the method, a cooking device comprised of: a housing, a cooking chamber, a door for accessing and closing the cooking chamber, at least one mechanism for receiving and holding at least one food product carrier at a predetermined level, and an inspection system including a distance sensor and a digital optical recognition device operate as follows: activating the distance sensor; detecting by the distance sensor the at least one food product carrier; determining by the distance sensor the level of the at least one food product carrier placement in the cooking chamber; capturing images by the digital optical recognition device of the food product; storing the food product images; comparing the stored food product images to previously stored food product images; selecting a cooking cycle/program associated with the food product based on the comparison; and starting the cooking cycle/program associated with the food product. Determining the level of the food product by the distance sensor allows for later checking that the correct cooked food product is removed at the end of the cooking cycle/program, and also allows for the digital optical recognition device to be correctly focused. These functions are performed by the distance sensor.

The steps of the method need not be performed in any particular order. The distance sensor may be activated automatically such as with a motion sensor. Alternatively, the distance sensor may be activated manually. Or, the images of the food can be captured before the distance sensor is activated. All that is required is that the images should be captured and the food product known, and that the placement of the food product in the cooking device should be also be known, prior to initiating the cooking cycle/program for the food product, so that the proper cooking cycle/program can be selected/set.

In another embodiment, the present disclosure provides a method of determining the quality of the cooked state of cooked food product. According to the method, a cooking device comprised of: a housing, a cooking chamber, a door for accessing and closing the cooking chamber, at least one mechanism for receiving and holding at least one food product carrier at a predetermined level, and an inspection system including a digital optical recognition device, operates as follows: signaling that a cooking cycle/program is finished (the finish of the cooking cycle/program can be indicated by a timer, a visual indicator such as a flashing light, an audio signal such as a bell, or other similar means); detecting by the distance sensor the level of the food product being removed from the cooking device; capturing images by the digital optical recognition device of the cooked food product; storing the cooked food product images; comparing the stored cooked food product images to images of known properly cooked food product of the same type of food/number and quality; and determining, based on the comparison, whether the cooked food product has been properly cooked.

In another embodiment, present disclosure provides inspection systems that can measure the surface temperature, or other aspects, of cooked food. The inspection system according to the disclosure determines surface temperature in any one of several ways such as by capturing an image or images of the surface of the cooked food product and determining by, e.g., shrinkage, color, evenness of browning, and the like, whether the cooked food product meets target cooked quality standard(s). For example, one target group for the cooking device of the present disclosure is fast food restaurants, or chain restaurants of any type (e.g., MacDonald's, and the like) each of which has its own quality standard for cooked food product offered to the public. Each cooked food product offered by these establishments has its own internal standard(s) for proper cooking that must be met. Especially so, these types of establishments require high quality and consistency of cooked food appearance.

One of the preferred cooking devices suitable for use in the present disclosure is known as a "combi-steamer" that is a cooking device for cooking with hot air, steam or superheated steam, or combinations of one or more of those cooking techniques, during any particular cooking cycle/program. In general, a suitable combi-steamer according to the present disclosure comprises at least a cooking chamber, a door that opens and closes for providing access to the cooking chamber, a steam generator, a fan, a heating element for heating the cooking chamber, and an electronic control with a user interface.

The term "digital optical identification device" as used in the present disclosure includes optics and means for electronic evaluation of the objects observed by the optics. The term "digital optical identification device" encompasses means "for recognizing food to be cooked" and "for evaluating the quality of the food product having been cooked". In other words, the recognizing and evaluation is by either the outer appearance, or surface temperature, or both, of the food product itself. Optical means that do not recognize and/or evaluate the quality of the cooked condition of the food product itself (for example, identification means as discussed in some of the above references in which an image of a symbol plate or of a bar code is captured, or in which identification of an RFID tag is made, etc.) are not meant to be within the scope of the wording "digital optical identification device", and are specifically excluded therefrom.

Although a "digital optical identification device" for the food to be cooked or cooked food product may produce wrong data sometimes, it is possible to reduce the error sources. For example, it will not be a source of error anymore that the operator of the cooking device attempts to insert or remove an incorrect food product into or from the cooking device at the beginning or after the completion of the specified cooking cycle/program. This is especially so if that cooking cycle/program for whatever reason was insufficient for or did not produce the quality of, e.g., the outer appearance of the cooked food product, or surface temperature of the cooked food product, that was desired. Rather, the cooking device uses real-time first-hand information on the type of food product, the amount of food product, the appearance of the food product, etc. to ensure (or act as confirmation) that the correct cooking cycle/program and quality of the food product is obtained.

In accordance with the present disclosure, the "digital optical identification device" generally comprises digital optical recognition devices such as a digital imaging device (although an analog digital optical recognition device may be used), for capturing one or more images of the food product before and after cooking, especially an electronic image sensor, such as a CCD sensor or a CMOS sensor. The "digital optical recognition device" can include optical heat sensors or IR sensors as well (although these may increase the overall cost of the cooking device) for determining food surface temperature, and these are included in the term "digital optical identification device".

An "image" in the context of the present disclosure may be a single image, or a series of images, such as a video. The "digital optical identification device" may comprise a controller having access to image data, i.e., pictorial or video "captures" of food to be cooked and of cooked food product. Thus, a controller is provided as part of the "digital optical identification device". The controller has access to the image data, i.e. the digital data that embodies the image of the food product to be cooked and/or cooked or that is calculated from the image (even of an analog image) taken of the food product to be cooked and/or cooked.

It is preferred but not necessary that "digital optical identification device" is provided wherein the image data will be in digital format from the beginning. This, however, is the easiest way for the image data to be further evaluated, analyzed and/or processed for purposes of quality control. The image data can be stored in data storage, or can be accessed directly by the controller. In an alternative embodiment, the image data can be in non-digital (e.g., analog) form, and it is then necessary to convert the image data to digital form. For example, colors can be calculated into shades of grey (that have been previously assigned digital values) and then analyzed digitally.

The digital optical recognition device may be (but as mentioned above, not exclusively) located outside of the cooking chamber, preferably directly above or laterally above the door providing access to the cooking chamber. From there, the digital optical recognition device has a reliable view of any food product that is moved into or out of the cooking chamber. Also, in normal operation, any food product on a tray or rack will normally be oriented horizontally directly in front of the tray rack onto which it will be placed. This position is preferable for reliably gaining an image angle towards the food product. If the digital optical recognition device is located at the cooking device door, it will also have a good view towards the cooking chamber of the cooking device itself, gaining some view into the cooking chamber when the door is opened.

In an alternative embodiment, the digital optical recognition device can be mounted on an extendable and retractable holder that extends when the cooking device door is opened and that retracts when the cooking device door is closed. It will be appreciated by those of skill in the art that this is another way to gain a good angle of view of both the cooked food product as well as into the cooking chamber. In a more specific, and in some cases preferred, embodiment it the digital optical recognition device is mounted on moving means in a manner that permits food product to be imaged from two different angles. An embodiment such as this makes it easy to gain more optical information about the cooked food product, thereby increasing the probability that the correct quality of the cooked state can be determined.

In addition to the digital optical recognition device already described above, in another embodiment a second, or more than a second, digital optical recognition device can be provided. It will be appreciated by those of skill in the art that everything described above for the first digital optical recognition device would also be applicable for a second or more than a second digital optical recognition device.

In an additional preferred embodiment of the present disclosure, a food product positioning area may be provided and marked on a front side of the cooking device, to which the field of vision of digital optical recognition device is directed. This arrangement simplifies the task of the operator to understand where the food product can be ideally placed in order to facilitate the recognition of the food to be cooked and the quality control of the cooked food product. In an independent aspect of this embodiment of the present disclosure, a shelf rail marker can be provided, preferably in the cooking chamber or at the shelf itself, the shelf rail marker highlighting positions of shelf rails for the digital optical recognition device and for the operator. The shelf rail marker can, for example, be a strip-like element that is attached along the side of the opening or of the cooking chamber at the level(s) of each shelf, or upon each shelf itself. There, the view toward the shelf rail marker will less likely be obstructed for the field of vision of the digital optical recognition device. The shelf rail marker(s) carries marked positions for the shelf rails. In this way, it is easier for the controller to evaluate the data from the digital optical recognition device. This data can especially be used in order to recognize in which shelf a tray with food product is being/had been inserted. The controller is, preferably, programmed to conduct an optical recognition of a tray level in which a tray had been inserted.

The distance sensor may be provided with a means to activate a light source for lighting a field of vision of the digital optical recognition device. By activating a light source, reproducible and more accurate results can be attained by the digital optical recognition device. Therefore, in a preferred embodiment, a controller and a digital optical recognition device are provided, wherein controller comprises means to activate a light source lighting a field of vision of the digital optical recognition device, either by activating the distance sensor to do so, or by directly doing so.

BRIEF DESCRIPTION OF THE DRAWINGS

Further features, advantages and details of the present disclosure will become apparent from the following description of the drawings, in that.

DETAILED DESCRIPTION OF THE DISCLOSURE

Figure 1:
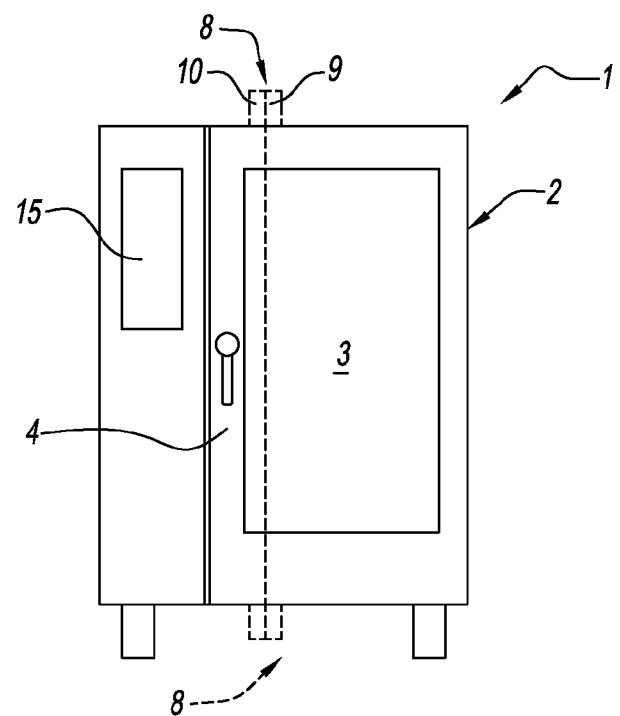
FIG. 1 shows a schematically simplified front view of a cooking device according to the present disclosure.

FIG. 1 shows a front view of the general configuration of a cooking device 1 that may be employed with the inspection systems of the present disclosure. Cooking device 1 can be a cooking device for commercial use such as, e.g., a combi-steamer, a baking oven or a microwave oven. Cooking device 1 comprises a housing 2 including a cooking chamber 3 that accessed by opening and closing a door 4. Cooking device 1 further comprises an inspection system 8 that is depicted in a highly simplified manner as two blocks; one block comprising a distance sensor 9 and the other block comprising a digital optical recognition device 10. As depicted in FIG. 1, inspection system 8 can be configured to be at or near the top of cooking device 1 near or adjacent door 4 (or alternatively at or near the bottom of cooking device 1) with distance sensor 9 and digital optical recognition device 10 in close proximity to each other. Cooking device 1 also includes a user interface 15.

As shown in FIG. 1, inspection system 8 of cooking device 1 includes one distance sensor 9 and one digital optical recognition device 10, and distance sensor 9 is used only to detect the level of a food product carrier 7 (see, FIG. 2) placed within cooking chamber 3 of cooking device 1 and carrying a food product P that is to be cooked. This aspect of the present disclosure is particularly relevant for larger cooking devices 1 that can be loaded with a plurality of food product carriers 7 so that different food product(s) P can be cooked simultaneously at different levels in cooking chamber 3. For such cooking device(s) 1, it is important to detect the food that has been loaded onto each level of cooking device 1 in order to be able to monitor whether or not the correct food product carrier 7 is being removed after completion of the cooking cycle/program. This is accomplished by inspection system 8 conducting a comparison of the data of the different placement level(s) during food product P loading and during food product P unloading, as will be further described in the disclosure that follows.

Preferably, during loading of food product P into cooking device 1, digital optical recognition device 10 of inspection system 8 of cooking device 1 captures one or a series of product images during the loading step for food product to be cooked, and this image information is not correlated with data obtained from distance sensor 9, as in some of the complex devices in the references mentioned above. Rather, the image information of food product P to be cooked is used only for product recognition purposes in order to ensure that the correct cooking cycle/program is selected for food product P actually loaded into cooking chamber 3.

Consequently, inspection system 8 of cooking device 1 according to the present disclosure does not require any specific control or assembly for cooking device 1 that is able to combine data obtained from distance sensor 9 with data obtained from digital optical recognition device 10. This simplifies the overall design, operation and maintenance of inspection system 8 of cooking device 1, as well as reduces the complexity and cost thereof. In other words, distance sensor 9 and digital optical recognition device 10 of inspection system 8 of cooking device 1 according to the present disclosure are used in an essentially uncoordinated or non-interdependent way, with distance sensor 9 acting only as a measuring device for determining the different levels of placement of food product P into cooking device 1, and with digital optical recognition device 10 functioning only as a product recognition device by capturing, assembling and storing food product image information. In another embodiment, the information from distance sensor 9 can also be used for adjusting the focus of digital optical recognition device 10.

Figure 2:
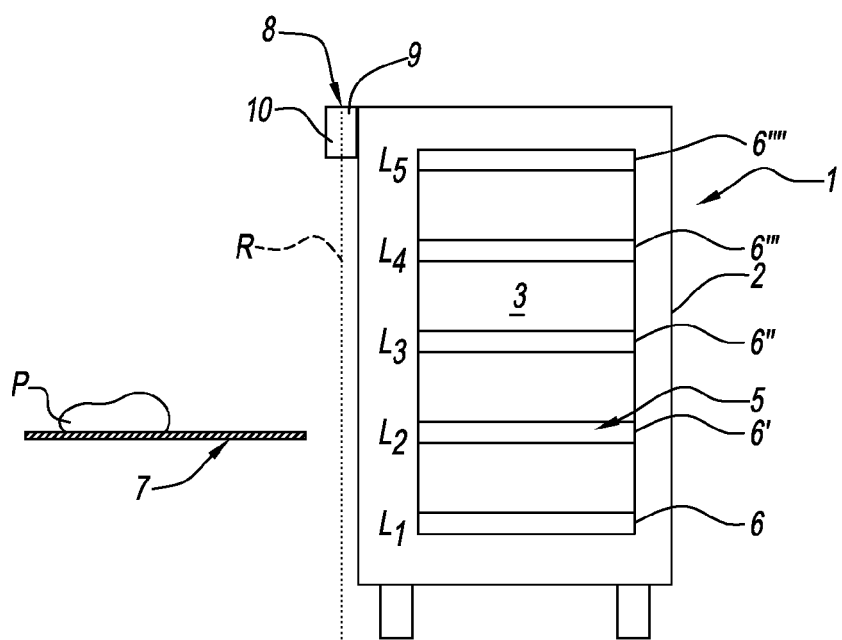
FIGS. 2-4 show schematically simplified side cross-sectional views of different embodiments of the cooking device of the present disclosure in different loading states, and/or with different positioning of the distance sensor.
Figure 3:
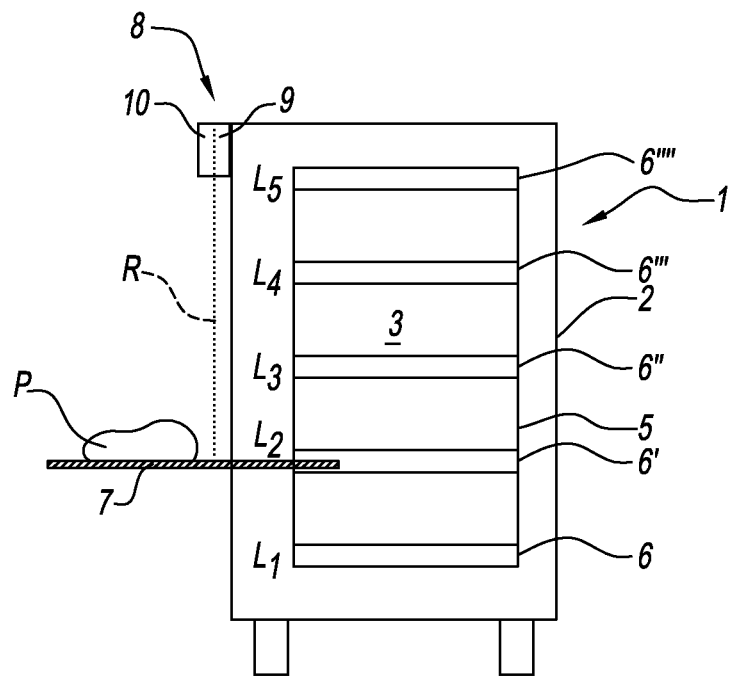
Figure 4:
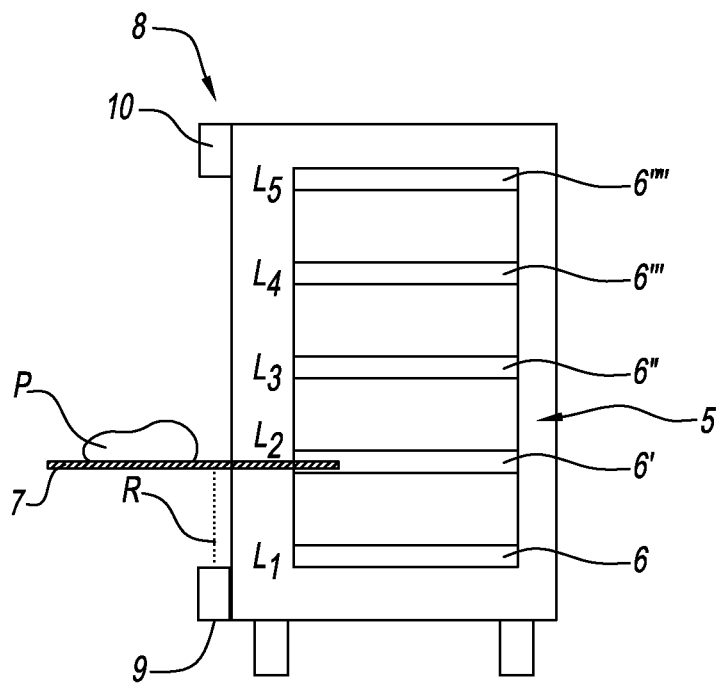

FIGS. 2-4 show that cooking device 1 includes, as the at least one mechanism for receiving and holding at least one food product carrier 7 within cooking chamber 3, racks 5 having a plurality of guide rail pairs, in the present case five guide rail pairs 6, 6', 6", 6''' and 6'''', disposed at different levels within cooking chamber 3 (i.e., in FIGS. 2-4 guide rail pair 6 is disposed at the lowest level of cooking chamber 3, and guide rail pair 6'''' is disposed at the highest level of cooking chamber 3). These are referred to as guide rail pairs because individual rails comprising the guide rail pair are disposed on opposite sides of cooking chamber 3 (i.e., from the perspective of FIG. 2, on the left and right internal walls (not shown or numbered) of cooking chamber 3, such that food product carrier 7 engaging any guide rail pair will be disposed substantially perpendicular to the left and right internal walls (not numbered), and substantially parallel to the bottom and top (not numbered) of cooking chamber 3. These guide rail pairs receive food product carriers 7 (e.g., trays) having food product P thereon.

Also, FIGS. 2 to 4 show a detection beam or ray R in the form of a dotted line that is emitted by distance sensor 9. FIG. 2 shows a state of operation of the disclosed device in that food product carrier 7 carrying food product P is approaching cooking chamber 3 (i.e., not yet disposed upon any guide rail pair 6-6''''). In FIG. 3, food product carrier 7 has reached the front edge of guide rail pair 6' such that detection beam R hits food product carrier 7 resulting in a corresponding signal to controller 12 (see, FIG. 6) for determining the level of food product P upon guide rail pair 6' that is, according to FIG. 2, level $L_2$. This distance measurement determined by distance sensor 9 is stored in a memory as part of a controller 12 (see, FIG. 6) of cooking device 3, or in a separate memory or data base.

Upon detection of the presence of food product carrier 7 by distance sensor 9, digital optical recognition device 10 is activated (e.g., by a signal received from sensor 9, or directly by controller 12), and digital optical recognition device 10 begins to capture images of food product P during the loading process of food product carrier 7 into cooking chamber 3. Alternatively, digital optical recognition device 10 may be activated in other ways that will be discussed with reference to FIGS. 5 and 6. The image information resulting from the images captured by digital optical recognition device 10 is also stored in the memory of controller 12 of cooking device 3, or in separate memory or data base, in order to be able to determine whether or not the correct food product P is loaded into cooking chamber 3. Also as shown in FIGS. 2 and 3, inspection system 8 can be disposed above and in front of cooking chamber 3. As shown in FIG. 4, distance sensor 9 and digital optical recognition device 10 can, alternatively, be disposed not in close proximity to each other; distance sensor 9 may be disposed underneath and in front of cooking chamber 3, with digital optical recognition device 10 disposed above and in front of cooking chamber 3. The function of distance sensor 9 is not influenced by this positioning. Also, as mentioned above, either of distance sensor 9 or digital optical recognition device 10 can be disposed inside cooking chamber 3, or both may be. In another alternative embodiment, distance sensor 9 can be disposed on, e.g., a guide rail or other structure (not shown), and move up and down alongside of door 4. In this sort of arrangement, distance sensor 9 is configured and constructed with means for activating its movement along, e.g., a guide rail or other structure, and for positioning distance sensor 9 adjacent to the placement level of food product carrier 7 being placed into (or being removed form) cooking device 3. Distance sensor 9 can be an infrared sensor or an ultrasonic sensor. In addition, cooking device 1 can be equipped with an illumination device (not shown) that can be triggered by distance sensor 9 or by a door switch contact (not shown) in order to illuminate food product P during image capture by digital optical recognition device 10.

An embodiment of a process according to the present disclosure will now be described with reference to FIG. 5. As is shown schematically in FIG. 5, there are interactions between the operator and of the pertinent components of inspection system 8 and cooking device 3 of the present disclosure. In general, the method includes the following steps.

In step 50, cooking device 3 ("unit" in FIG. 5) is switched on by the operator. Upon switching on cooking device 1, the controls of cooking device 1 are also switched on as shown in step 51 and distance sensor 9 is activated as shown in step 52. Steps 51 and 52 can either be automatically performed as a result of step 50 or can be separate actions performed by the operator. Preferably, and to avoid mistake and to reduce the number of steps performed by the operator, steps 51 and 52 are automatically performed as a result of step 50. Distance sensor 9 monitors door 4 of cooking chamber 3 opening and the approach of food product carrier 7 ready for loading into cooking device 1.

When food product carrier 7 approaches cooking device 1 and is going to be inserted into cooking chamber 3 as shown in step 53, distance sensor 9 measures the level e.g., $L_1, L_2$, etc., of food product carrier 7 as it is placed onto, e.g., a guide rail pair 6, 6', etc. The level of food product carrier 7 is stored in memory of controller 12 as shown in step 54 (or alternatively in separate memory or data base accessible to/by controller 12). In conjunction with storing the level of food product carrier 7 in cooking chamber 3, digital optical recognition device ("d.o.r.d." for ease of reference in the description in the Figures) 10 is activated (preferably automatically) as shown in step 55 and the focus of digital optical recognition device 10 is adjusted (also preferably automatically, such as by distance sensor 9 or by controller 12) as shown in step 56 according to the measurement of the level of food product carrier 7. Digital optical recognition device 10 captures at least one and preferably a series of images as shown in step 57 of food product P on food product carrier 7. Digital optical recognition device 10 is preferably automatically activated by controller 12 being triggered by distance sensor 9 (as soon as same detects the presence of a food product carrier 7) or by a door contact switch (not shown). The captured food product image(s) are stored in memory of controller 12, or in separate memory or data base associated with cooking device 1 and accessible by controller 12.

Next, the series of captured images of food product P is delivered to controller 12 as shown in step 58, and controller 12 selects the image(s) with the best quality (i.e., in terms of clarity, color, etc.) for food product recognition as shown in step 59. The selected image(s) is/are then compared, as shown in step 60, by controller 12 to previously captured and stored images which are in the data base. Again, the data base of previously taken images can be stored in memory of controller 12 or in separate memory or data base (not shown) of cooking device 1, or can be stored in a remotely located memory or data base. Also, the previously captured images can be, among others, of food product P previously cooked in the same cooking device 1, selected from a compilation of food product P previously cooked in other cooking devices 1 at the same or similar facility, or of "stock" images of food product P.

Next, food product P is identified as shown in step 61 by a comparison of the captured images of food to be cooked to the stored images of food to be cooked. Cooking device 1 displays an image, pictogram, text information or other food product descriptive information on a display as shown in step 62 (display not shown in FIG. 5) as a result of the comparison and identification of food product P. Optionally, if the comparison of the taken images with the stored images does not permit a clear recognition of food product P, two, or more if necessary, food products P "best fitting" the food product images are displayed on display to the operator, as shown in step 63. In this case, the operator manually selects the correct identification for food product P to be cooked and/or a correct cooking cycle/program that needs to be started manually.

The memory of controller 12 and/or memory or data base of cooking device 1 (or of remote memory or data base) also has cooking cycle/programs stored for food products P (both food product type and/or number) and food product level placement in cooking device 1. For example, whole roasted chicken will have cooking cycle/program(s) stored for each food product level, baked ham will have its own respective cooking cycle/program(s) for each food product placement level, as will cakes, vegetables, etc. Only if identification of food product P is incorrect will cooking device 1 be activated to perform a pre-set cooking cycle/program selected by the operator, based on the food identification decided by the operator from a comparison of the obtained and stored product images with the list of products that fit into the selected cooking cycle/program.

The method of the present disclosure also includes the output of a warning signal if the comparison between the stored food product images and the food product list fitting into the selected cooking cycle/program results in the determination that an incorrect food product has been loaded into cooking chamber 3. If, however, the comparison reveals that the correct food product has been loaded into cooking chamber 3, the cooking process as shown in step 64 is performed.

When the selected cooking process has been finished, cooking device 1 signals as shown in step 65 that cooked food product P can be unloaded from cooking chamber 3. Together with the signal indicating the end of the cooking cycle/program, the display shows, as indicated in step 66, the identification of the food product P that has to be unloaded from cooking chamber 3 and the respective level of food product carrier 7 placement, i.e., 6, 6', 6", etc., of cooked food product P. During the step of unloading food product carrier 7, the method according to the present disclosure also monitors, as shown in step 67, which food product carrier 7 is to be unloaded and, as shown in step 68, whether or not the correct food product carrier 7 is being unloaded from cooking chamber 3. The monitoring is performed by distance sensor 9 recognizing the level of food product carrier 7 being removed in comparison to the correct food product carrier 7 that is supposed to be removed (as shown in step 66). If the monitoring and comparison as shown in steps 67 and 68 reveal that the incorrect food product carrier 7 is being unloaded from cooking chamber 3, a warning for the operator is given as shown in step 68. Otherwise, cooked food product P can be removed from cooking chamber 3.

The method of the present disclosure makes it possible to easily control cooking device 1 with respect to the aspect of the pre-heating temperature of cooking chamber 3 for food product P being loaded and cooked in cooking device 1. In this regard, as soon as the first food product P, having a selected cooking cycle/program is going to be loaded into cooking chamber 3, it is possible to determine whether or not the pre-heating temperature of cooking device 1 is correctly set, on the basis of the recognition of the respective food product P. If cooking chamber 3 is not correctly pre-heated, it is possible to output a warning signal for the operator so that cooking chamber 3 can be heated to the correct pre-heating temperature. After reaching this correct temperature, cooking device 1 can output a loading request for the selected food product P.

As an alternative to the foregoing, it is possible to accept the selected food product P, to load cooking chamber 3 accordingly and to heat cooking chamber 3 to the correct pre-heating temperature with food product P loaded. In this case, the cooking time is adapted accordingly. In the situation where cooking chamber 3 is already loaded with food product P, the method of the present disclosure makes it possible to compare food products P that have been recognized from the images captured by and stored from digital optical recognition device 10 with the list of food product(s) P that fit into the selected pre-set cooking cycle/program. So, again, any incorrect food product P loading can be avoided easily and reliably.

One embodiment of the inspection system of cooking device 1 will be discussed with reference to FIG. 6. In the discussion that follows with respect to FIG. 6, the process steps in accordance with FIG. 5 will be cross-referenced, as will the inspection system components referenced in the discussion surrounding FIG. 5.

In accordance with FIG. 6, distance sensor 9 and digital optical recognition device 10 (comprising inspection system 8) will be discussed in combination with cooking device 1 that is a combi-steamer. Main switch 11 is activated that, in turn, activates controller 12. Controller 12 controls all cooking functions, such as time and temperature of the cooking cycle/program. Controller 12 also activates distance sensor 9 (however, as mentioned above, distance sensor 9 may be manually activated). As can be seen from the bi-directional arrow between controller 12 and distance sensor 9, once activated, distance sensor 9 recognizes that food product P is being placed into cooking device 1, sends distance information to controller 12 and that information can be stored in memory of controller 12 or in a separate memory or data base, for several functions. These functions including controller 12 providing the cooking cycle/program for food product P loaded into cooking device 1, recognizing whether the correct food product P is being removed from cooking chamber 3, and the like.

Figure 6:
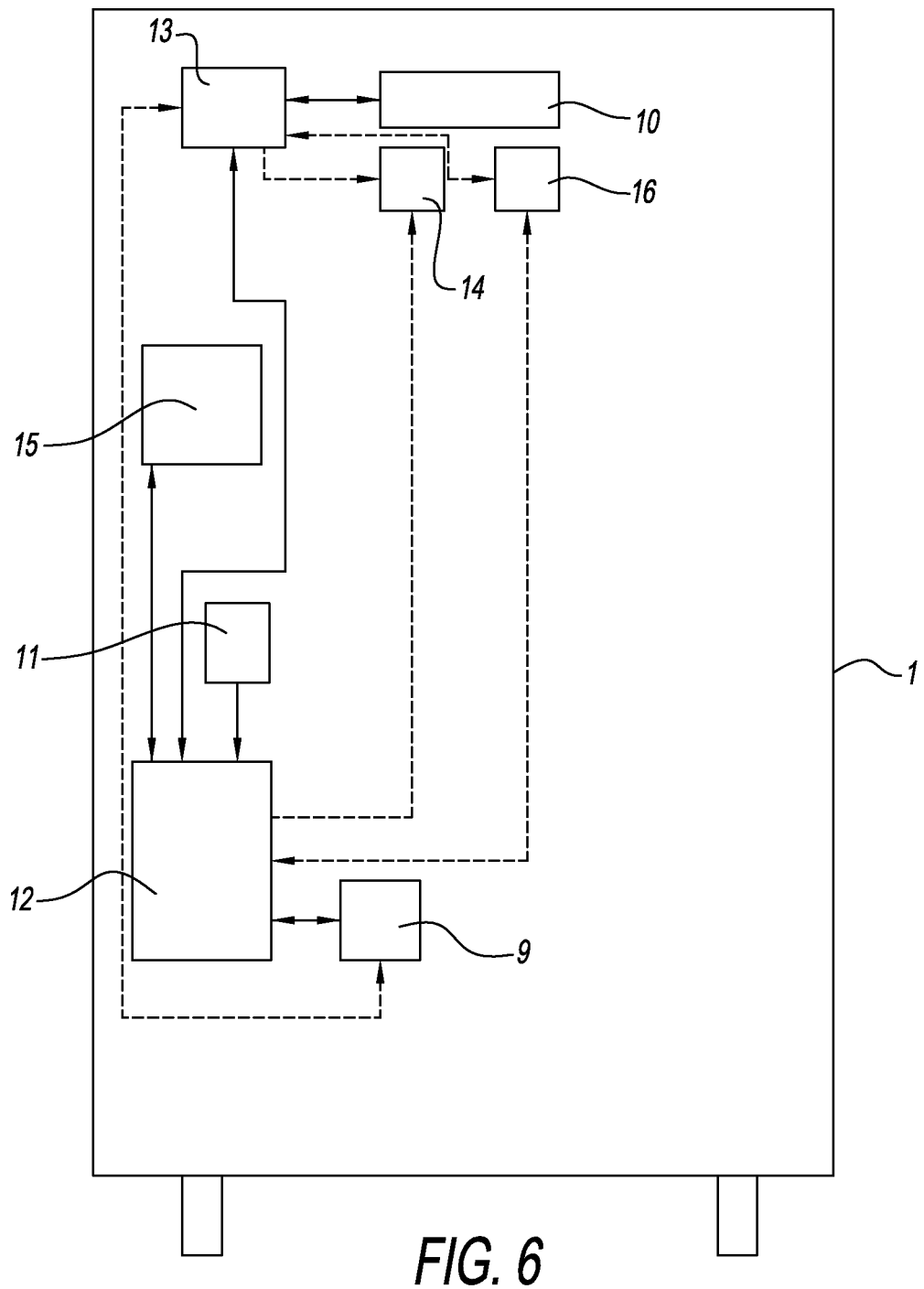
FIG. 6 shows schematically one embodiment of a control system of the present disclosure.

As can be seen in FIG. 6, controller 12 also activates a control 13 that controls digital optical recognition device 10 and, if present, a light 14. Alternatively, controller 12 may activate digital optical recognition device 10 and light 14 directly. Controller 12 also has access to stored images of various food product types, both cooked and uncooked, and quantities of the same, and it is control 13 that performs the comparison of food product images captured by digital optical recognition device 10 with the stored food product images. Control 13 may be included as part of controller 12 but, in any event, control 13 is specifically for food product recognition. As food product images are captured by digital optical recognition device 10, that information is relayed to control 13 (as indicated by the bi-directional arrow between control 13 and digital optical recognition device 10), and the product identification made by control 13 is relayed to controller 12 (indicated by bi-directional arrow between control 13 and controller 12). Controller 12 selects the cooking cycle/program for the identified food product P, and sends that information to a user interface 15. User interface 15 includes, e.g., a touch screen and/or a display for providing information, such as product recognition information and cooking cycle/program, to the operator. Also as indicated by the bi-directional arrow between user interface 15 and controller 12, those components are interactive with each other. This interaction is useful in the case where, for example, the operator needs to override the cooking cycle/program because the product recognition is incorrect. In this case, the operator selects the food product and cooking cycle/program and this information is sent to controller 12 so that the proper cooking cycle/program is selected.

In accordance with the present disclosure, the inspection system 8 also provides an evaluation of the state of food product P after it has been cooked to determine whether the cooked state of food product P meets quality standards, such as degree of doneness, appearance, etc. In this regard, inspection system 8 comprised of distance sensor 9 and digital optical recognition device 10 perform in the same manner as described in accordance with FIGS. 5 and 6 with the interactions between the components as described in FIGS. 5 and 6 with respect to pre-cooking product identification and cooking cycle/program selection. However for the evaluation of the state of the food product after it has been cooked, some additional general description of the data utilized to make the evaluation will be set for in the description that follows.

Controller 12 is preferably programmed to signal to an operator food product P and location ($L_1$, $L_2$, etc.) in cooking device 1 from which cooked food product P should be removed. The name of food product P can be shown in text on a display, pronounced by controller and a loudspeaker or an image of food product P can be shown, or several characteristic features of food product P can be listed on a screen. Preferably, more than one way of signalling is used. In a related manner, the operator is given a warning if the incorrect food product is being removed from cooking chamber 3, notwithstanding the indication of which food product P should be removed. Because cooking device 1 has previously stored the information concerning the location/level and food product type/quantity at the beginning of the cooking cycle/program, it is an easy matter for the cooking device to indicate to the operator if the incorrect food product P is being removed from the cooking device. The indication that an incorrect food product P is being removed can be performed by distance sensor 9, alone, or this function can be performed by digital optical recognition device 10.

When a cooking cycle/program is finished and, assuming that the correct food product P has been removed from cooking chamber 3, the cooked state of food product P is evaluated as follows. As correct food product P is removed from cooking chamber 3, digital optical recognition device 10 is again activated and captures images of cooked food product P. Preferably, because food product P was identified correctly before cooking, and the placement of food product P is known to controller 12, the data base of stored images of properly cooked food product P need only be searched for comparison purposes with respect to whether food product P being removed from cooking chamber 3 has been cooked properly. Assuming the comparison and analysis determines that food product P has been cooked properly food product P is removed and available for further use.

If it is determined that food product P is not cooked properly, the operator is provided a warning and, preferably, provided with further instructions (e.g., additional cooking time). In this case, several different options can be employed. One option is in the case where the entire tray/rack of food product needs further cooking. In this case, controller 12 sets a new cooking cycle/program for the tray/rack of food product P. Another option is in the case where the entire tray/rack of food product does not need further cooking, but rather only a portion thereof. The case where one piece of food product needs further cooking will be discussed now, but it should be understood that this is applicable to more than one piece of food product as well. As part of the visual and/or thermal analysis of the cooked food product P, controller 12 is able to identify for the operator, either by visual output on a display or by a numerical indication on a display, that food product P needs further cooking. The operator removes food products P that do not need further cooking from the tray/rack and places food product P that needs further cooking back into the cooking device for further cooking in accordance with the cooking cycle/program indicated by controller 12 for food product P needing further cooking. As mentioned, the determination of whether food product P has been cooked correctly may be based upon the visual and/or surface temperature analysis. The visual analysis is performed by controller 12 based on the comparison of, e.g., the surface appearance of food product P being removed from cooking device 1 with the surface appearance of stored images of correctly cooked food product P of the same or similar type. For thermal analysis, as shown in FIG. 6, at the outside of the cooking device, a temperature sensor 16 may be provided. Preferably, temperature sensor 16 is an infrared (IR) sensor.

In addition to having access to stored image data, controller 12 may have access to a physical feature data base (also in digital form), so that controller 12 can compare the image data of images captured by digital optical recognition device 10 of cooked food product P to physical features and quality of the cooked state of various food product types. Controller 12 thus can analyze and compare the quality of the "unknown cooked state" of cooked food product P to the quality of the "known cooked state" physical feature data base of various food product types stored in the physical feature data base in controller 12. In this variation, controller 12 thus has two data sources: (1) one source is the data attributed to the actual image of the cooked food product; and (2) the other source is the data attributed to typical images, or with previously taken images of, several different cooked food product types and amounts, sizes, surface appearance, etc. By having access to the above two different data sets, controller 12 can compare the different data sets, one to another. As a consequence, controller 12 can make an analysis and deduce whether the food product of that an image(s) has just been taken corresponds to certain sets of data in the physical feature data base.

As an alternative or additional method, the comparison performed by controller 12 can be based on physical features deduced from the images data. This can, for example, be accomplished by controller looking for, and/or determining the presence of, certain characteristics such as contours, colors, curvatures, sizes, proportions, color contrasts, temperature etc. For a physical feature identification of the state of cooked food product P by comparing to characteristic data, it is preferred according to the present disclosure for the physical feature data base comprise data for at least one of the following features of the food product: form, color, size, amount of curvature of the outline, surface area, center of area, color, and surface pattern of the food product, etc. Once the image, features, name, and a corresponding degree of quality of cooked state for a certain food product type is stored in the data base, cooking device 1 via controller 12 can always determine the quality of the same or similar cooked food product P in the future. The data gained can be electronically pushed to other cooking devices that are in the same cooking device group, e.g., neighboring cooking devices in the cooking facility or remotely located cooking devices.

An alternative way for gaining data about the quality of the cooked state of food product P is to load data sets, preferably from the manufacturer of the cooking device. The manufacturer can create data sets by testing publically available food product, or even by testing special food product. For example, a fast-food company will have a certain product, either already on offer or to be newly introduced to the market. The fast-food product company can deliver food product samples to the cooking device manufacturer, and the manufacturer will have a laboratory in that data sets for the quality of the cooked state of the food product can be created in the most accurate way possible.

Figure 7:
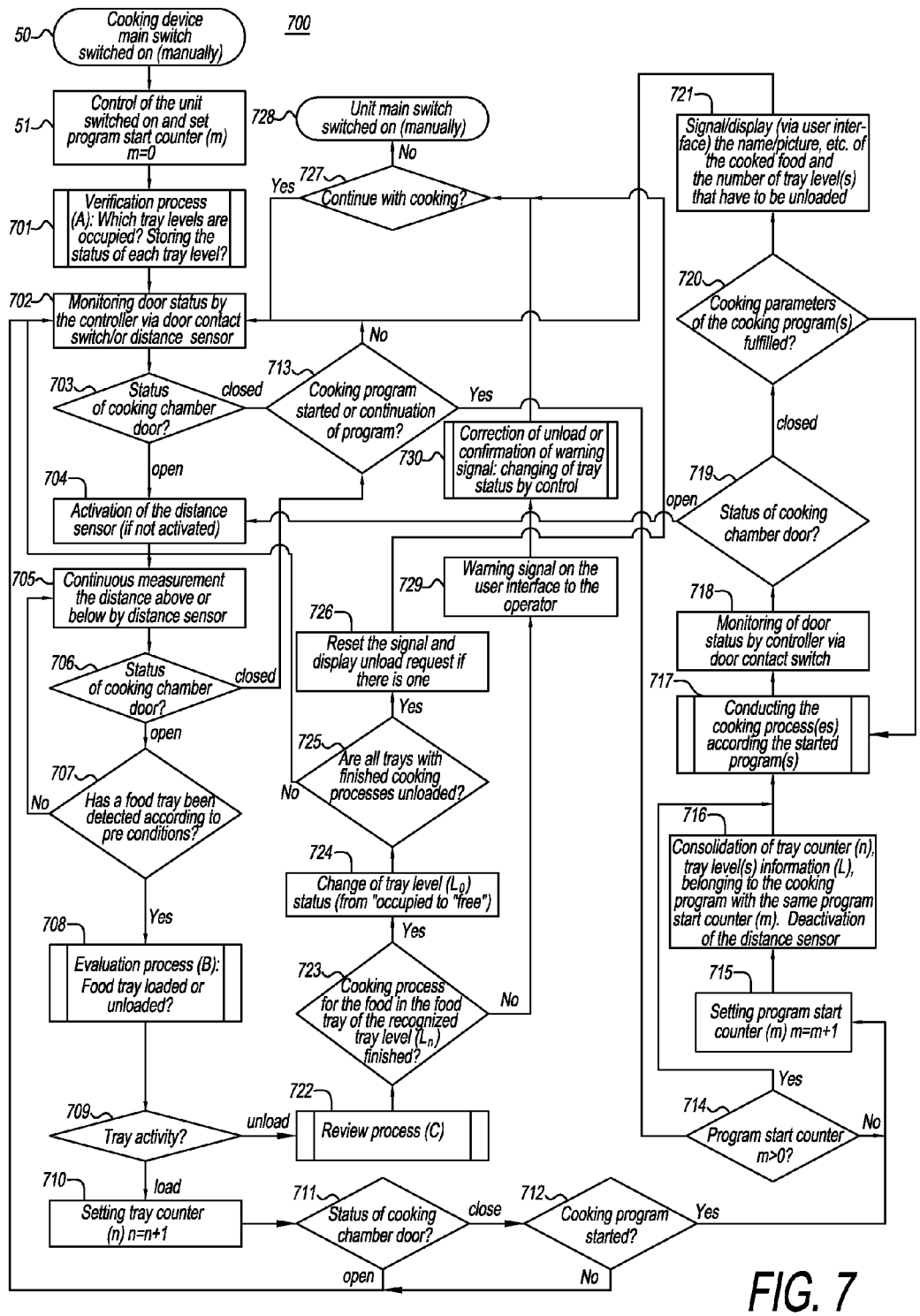
FIG. 7 shows a process flow chart of the cooking device and methods of the present disclosure.

A logic diagram/flow chart relating to an embodiment of a process according to the present disclosure will now be described with reference to FIGS. 7-10. As is shown schematically in FIGS. 7-10, according to the present disclosure, there are interactions between the operator and the pertinent components of inspection system 8 and cooking device 1. As is also shown in FIG. 7, the logic diagram/flow chart includes several areas of decision-making by inspection system 8 and/or operator. These will be explained in conjunction with FIGS. 7-10.

In FIG. 7, there is shown process 700. In the flow chart of process 700, the "diamond" shaped boxes indicate check points with question(s). Depending upon the answer to the question(s), the process proceeds in one or another direction. Also in the flow chart of process 700, the "simple rectangular" shaped boxes indicate actual process steps. Finally in the flow chart of process 700, the "double rectangular" shaped boxes indicate sub-processes. These designations will become apparent in the discussion that follows. However, for purposes of the following discussion, all of the individual boxes will be referred to as process steps.

Figure 5:
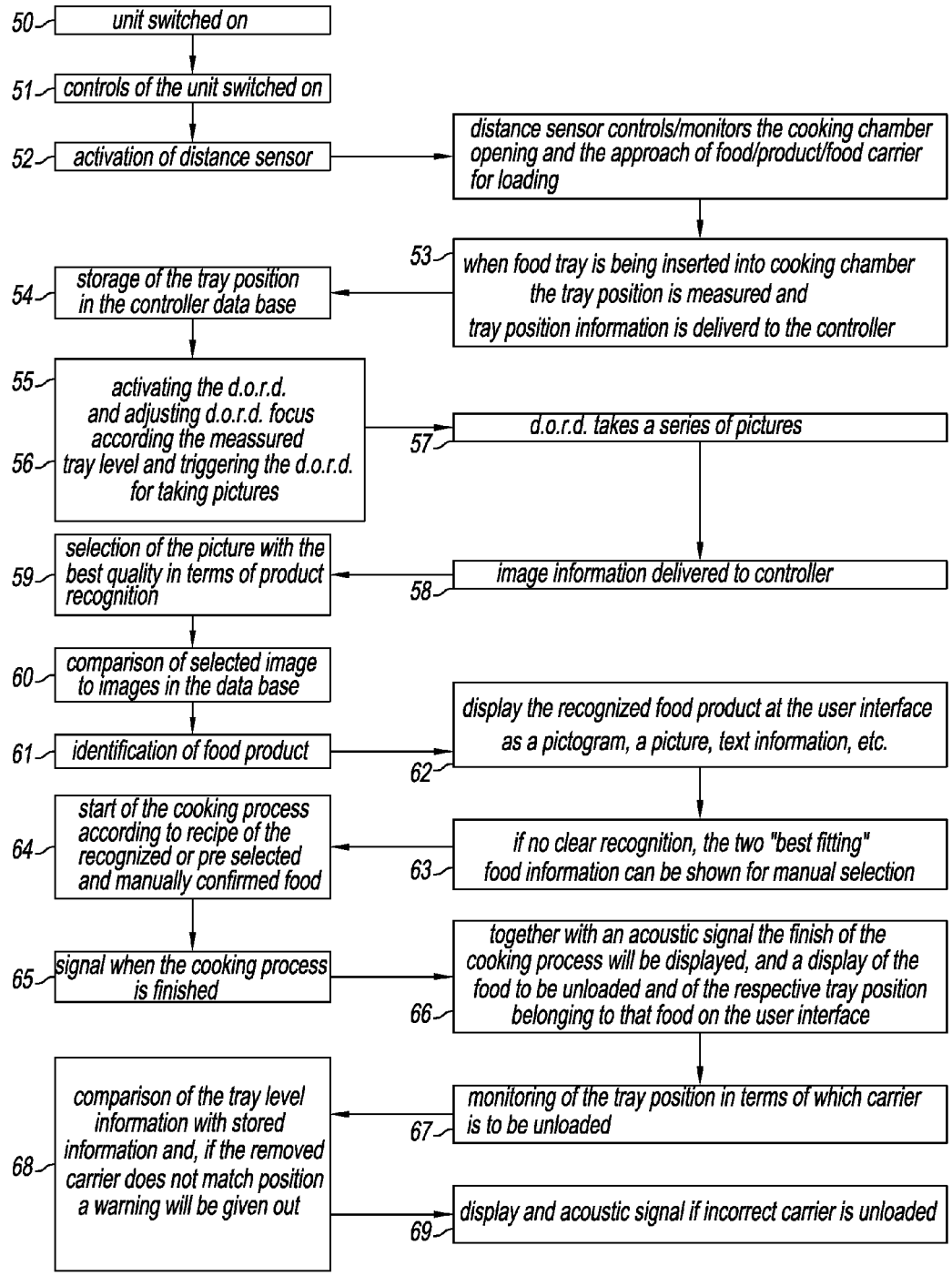
FIG. 5 shows schematically one embodiment of a process of the present disclosure.

In process 700, the operation commences with steps 50 and 51 (see, FIG. 5). In step 50 the main switch of cooking device 1 is switched on (manually), and in step 51 the controls of cooking device 1 are switched on as well. As part of overall process 700, there is included a cooking cycle/program start counter (m) that increases by "1" each time a cooking cycle/program is commenced, as shown in step 715 of FIG. 7. Thus, when cooking device 1 is first switched on in step 50 and controls of the unit are also switched on in step 51 the cooking cycle/program counter is zero (m=0).

Figure 8:
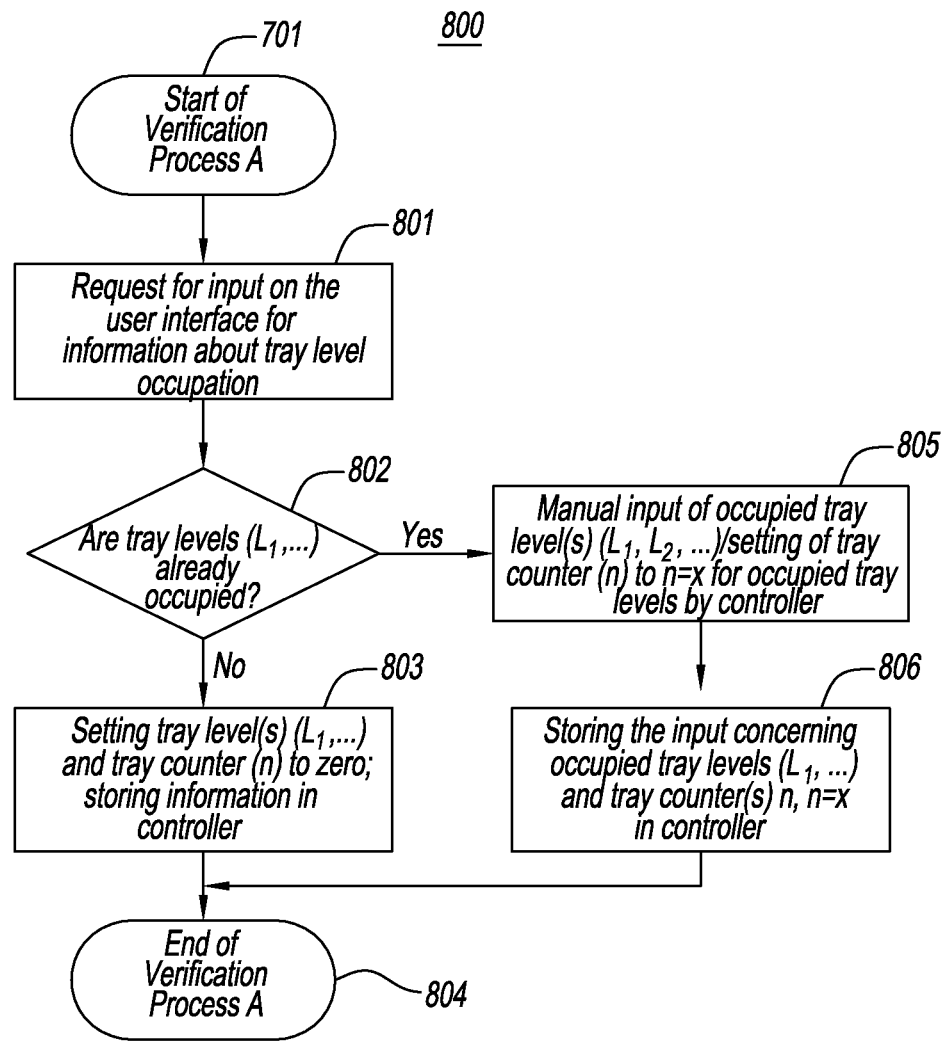
FIGS. 8-10 show sub-processes of the overall process flow chart of FIG. 7.

In step 701 verification process (A) (see, FIG. 8) is initiated. In general, verification process (A) relates to a determination of which is tray levels are already occupied and which tray levels are available, and storing the status of the tray levels ($L_1$, $L_2$, etc.) (i.e., is a tray level "occupied" or "free"). Turning to FIG. 8, verification process (A) is set forth in process 800. Verification process (A) is done only once when cooking device 1 is turned on. Verification process (A) begins with an input request in step 801, in which the operator receives a request on user interface 15 for information about tray level occupancy. Referring to FIG. 8 in more detail, in step 802 of verification process (A) 800 the operator is requested for input concerning tray level occupation. If the tray level(s) is/are not occupied, verification process (A) proceeds to step 803. In step 803 will be the tray counter (n) set to zero. This information is stored in controller 12. At this point, step 804 verification process (A) 800 ends and process 700 proceeds to step 702 (see, FIG. 7). However, if one or more tray levels have already been occupied verification process (A) proceeds to step 805. In step 805, the operator manually inputs the tray levels which are occupied ($L_1$, $L_2$, etc.), and sets tray counter (n) to the number of tray levels occupied. Again, this information is stored in controller 12 in step 806. At the end of step 806 verification process (A) returns to step 804.

Returning now to process 700, in step 702, the status of door 4 of cooking device 1 is monitored. In the usual case, the status of door 4 is monitored by a door contact switch or, alternatively, may be monitored by distance sensor 9. In step 703, the status of door 4 is evaluated. If door 4 is open process 700 proceeds to step 704. In step 704, distance sensor 9 is activated (if not having been previously activated by, e.g., controller 12). From step 704 process 700 proceeds to step 705. In step 705 distance sensor 9 continuously measures the tray level from either above or below door 4, depending upon the placement of distance sensor 9. Distance sensor 9 may be calibrated with respect to the number of tray levels in cooking device 1. From step 705, process 700 proceeds to step 706. In step 706, the status of door 4, whether open or closed, is again determined. If door 4 is open, process 700 proceeds to step 707. In step 707, distance sensor 9 determines whether a food tray 7 carrying food product P is detected. Distance sensor 9 detects whether a food tray 7 (see, FIG. 2) carrying food product P, according to various preconditions. For example, if the operator places his arm in ray R (see, FIG. 2) and removes it, a food tray 7 will not be detected because of the distance of the operator's arm and because of the speed/time in which the operator's arm is likely to be in ray R (see, FIG. 2) of cooking device 1. Likewise, if the distance determined by distance sensor 9 does not fall within the calibration of distance sensor 9 with respect to the location of tray levels ($L_1$, $L_2$, etc.) relative to distance sensor 9, then distance sensor 9 will not detect that a food tray 7 is being placed in cooking chamber 3. If a food tray 7 is detected in step 707, process 700 proceeds to step 708.

Figure 9:
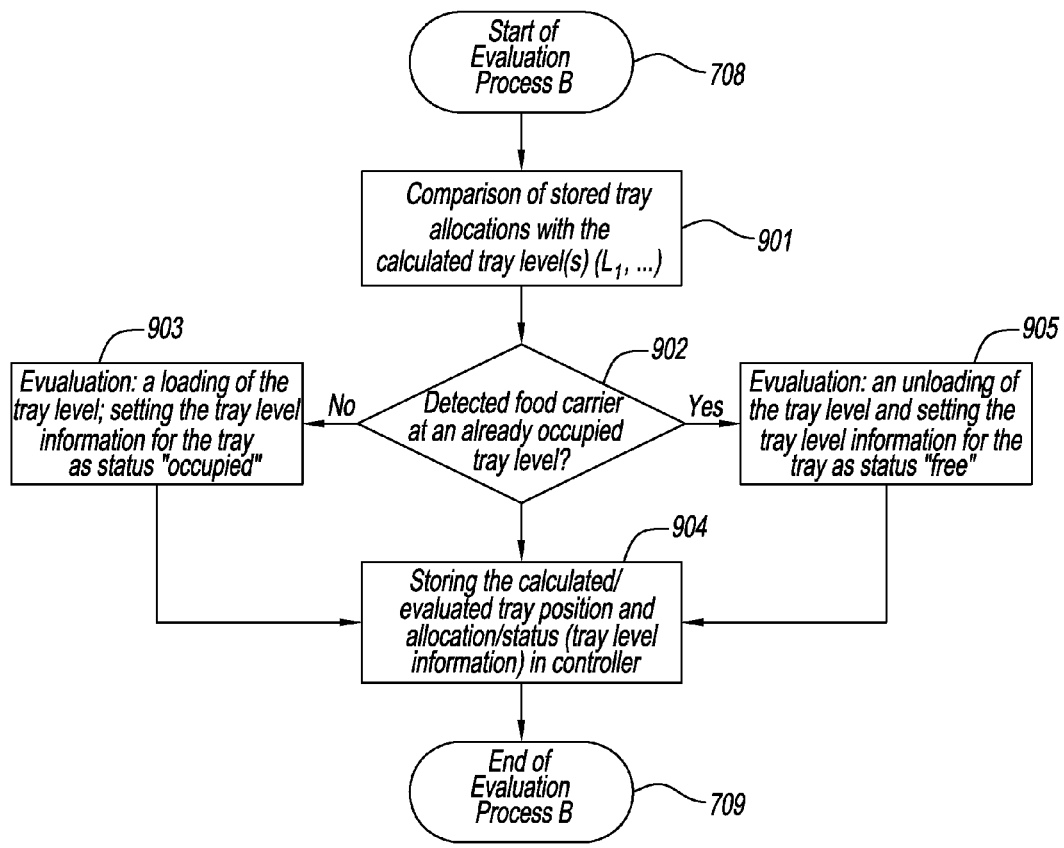
Figure 10:
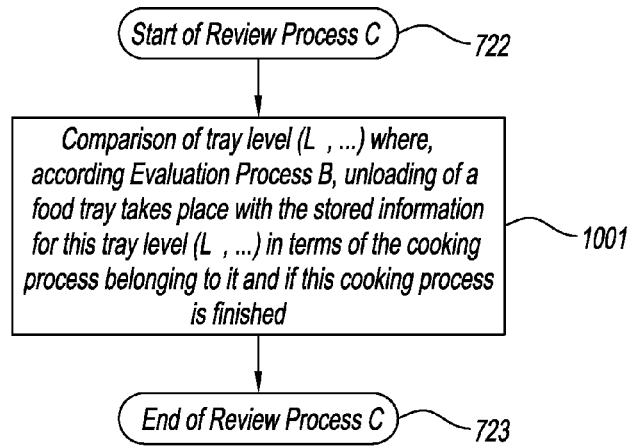

Step 708 includes evaluation process (B), and is described in more detail in FIG. 9. Overall, in evaluation process (B) distance sensor 9 determines whether a food tray 7 is being inserted or removed from cooking chamber 3. Evaluation process (B) performs this decision as follows. In step 901, distance sensor 9 and controller 12 compare the level of the calculated tray level detected and observed by distance sensor 9 with the stored tray level allocations. As a result of step 901, a determination is made in step 902 whether the detected food tray 7 is associated with a tray level already occupied and stored, preferably, in controller 12. If the calculated tray level detected by distance sensor 9 is for an unoccupied tray level, then evaluation process (B) determines the activity to be a loading process, i.e., placing food into the detected tray level ($L_1$, $L_2$, etc.), and the tray level is now automatically given the status of "occupied" in controller 12 in step 903. In step 904, the calculated and evaluated tray level is given an allocation status (i.e., "occupied" or "unoccupied") that is stored in controller 12. If the determination is made in step 902 that, based upon the calculated tray level detected by distance sensor 9, the tray placement is for an occupied tray level, then evaluation process (B) in step 905 determines that the activity associated with the detected tray is an unloading process. Also, in step 905, the tray level allocation status is now changed to "unoccupied" or "free". From step 905 evaluation process (B) again proceeds to step 904, in which the tray position and allocation status is stored in controller 12. The evaluation process then ends and process 700 proceeds to step 709. Although the evaluation process (B) has been described here with specific mention of distance sensor 9, the loading and unloading can be determined by optical digital recognition device 10 as well, through a series of images and/or a video In step 709, if evaluation process (B) determined that the activity was a loading activity, then process 700 proceeds to step 710. In step 710, the tray counter (n) is increased by "1" and this information is stored in controller 12. From step 710, process 700 proceeds to step 711. In step 711, the status of door 4 is again determined. If door 4 is open, process 700 returns to step 702 and process 700 beginning with step 702 is repeated. In step 711, if it is determined that door 4 is closed, process 700 proceeds to step 712. In step 712, controller 12 determines if a cooking cycle/program is started. If step 712 determines that a cooking cycle/program has not been started, then from step 712 process 700 returns again to step 702 and process 700 continues from that point.

In step 707, the preceding discussion was with respect to the situation where a food tray 7 had been detected by distance sensor 9 according to specific preconditions. In that situation, process 700 proceeds to evaluation step (B) set forth in FIG. 8. If, however, in step 707, a food tray 7 was not detected, process 700 returns to step 705. Also, with respect to the above description, in step 706, the status of door for was determined to be "open". If, however in step 706, it was determined that door 4 was "closed", then process 700 would proceed to step 713. At this point it should be noted that in step 703 the above description was with respect to the status of door 4 being "open". However, in step 703, if the status of door 4 is determined to be "closed", then process 700 would proceed from step 703 also to step 713.

In step 713, a determination is made as to whether a cooking cycle/program has been started or if a cooking cycle/program is continuing. If the answer to that question is "no", process 700 returns once again to step 702. If the answer to the question of whether a cooking cycle/program has been started or a cooking cycle/program is running is "yes", process 700 proceeds (whether step 713 is performed from step 706 or 703) to step 714. In step 714, a determination is made as to the numerical value of cooking cycle/program counter (m). If cooking cycle/program counter (m) is equal to zero, then process 700 proceeds to step 715. In step 715, cooking cycle/program counter (m) is set by controller 12. In this way it is known how many cooking cycle/programs have been started in cooking chamber 3 for any particular time period beginning with cooking device 1 switched on in step 50 (see, FIG. 5). From step 715 process 700 proceeds to step 716. In step 716, the information for the cooking cycle/program(s) (there may be more than one cooking cycle/program initiated or more than one food tray 7 placed into cooking chamber 3) is consolidated and stored. This information includes the position occupied by food trays for which the cooking cycle/program is the same, the recipe(s) that has/have been started and the number of food trays that are to be cooked according to the recipe(s). All of this information is consolidated in step 716. Also in step 716, distance sensor 9 is deactivated because distance sensor 9 is not needed during cooking or when door 4 is closed. In step 714, if the numerical values of cooking cycle/program counter (m) is greater than zero, process 700 proceeds to step 717 and cooking continues according to the program(s) that have been started. In step 718, the status of door 4 continues to be monitored, preferably by controller 12 via a door contact switch, and if door 4 is determined to be "opened" in step 719, then process 700 returns to step 704. If in step 719, the status of door 4 is determined to be "closed", then process 700 proceeds to step 720. In step 720, a determination is made as to whether the cooking parameters of any one or more of the cooking cycle/programs have been fulfilled. If the answer to this question is "no", process 700 returns to step 717. If the answer to the question in step 720 is "yes", process 700 proceeds to step 721. In step 721 a signal is provided that a cooking cycle/program is finished, and preferably a display (via user interface 15) of the food for which the cooking cycle/program has been finished and the tray level(s) that have to be unloaded is presented to the operator. The indication to the operator as to the food product P and tray level ($L_1$, $L_2$, etc.) that needs to be unloaded is based on the consolidated information gathered in step 716. At this point, from step 721, process 700 proceeds to step 702.

At the end of a cooking cycle/program as determined in step 721 and proceeding through from step 702 to step 709, process 700 will now determine in step 709, the evaluation process (B), that the activity is one of "unloading". At this point, process 700 proceeds to step 722, the review process (C), which is set forth in more detail in FIG. 10. In review process (C), in step 1001, controller 12 compares the tray level where, according to evaluation process (B), an unloading of the food tray is occurring with the information relating to this tray level in terms of the cooking cycle/program belonging to the tray level and if this cooking cycle/program is finished. Once that comparison is made in step 1001 process 700 proceeds to step 723.

In step 723, a determination is made as to whether the cooking cycle/program for the food product P on the food tray 7 of the detected tray level ($L_1$, $L_2$, etc.) is finished. If the answer to that question is "yes", process 700 proceeds to step 724. In step 724, the status of the tray level for which the cooking cycle/program is finished is change from "occupied" to "free". Process 700 then proceeds to step 725. In step 725, a determination is made by controller 12 as to whether all of the trays with finished cooking cycle/programs have been unloaded. If the answer to that question is "yes", process 700 proceeds to step 726. In step 726, the signal and food identification provided to the operator in step 721 is cleared and process 700 proceeds to step 727. In step 727, the determination is made as to whether other cooking will continue. If the determination is made in step 727 that cooking will not continue, then process 700 proceeds to step 728. In step 728, cooking device 1 can be switched "off". If in step 727, the determination is made that cooking will continue, then process 700 proceeds back to step 702, and process 700 continues. If in step 723 it is determined that the cooking cycle/program for the food product P in food tray 7 being removed from the detected tray level is not finished, then process 700 proceeds to step 729. In step 729, a warning signal is provided to the operator via user interface 15. Process 700 then proceeds to step 730. In step 730, either the error of removing the incorrect food tray is corrected by the operator, or the operator manually confirms the warning signal. In this latter instance, controller 12 changes the status of the tray level in question from "occupied" to "free". From step 730, process 700 again proceeds to step 727, as described above.

As will be appreciated from the above description, the systems and methods of the present disclosure allow for continual monitoring of the cooking process and provide several points of decision for the operator to input decisions/information, while at the same time providing automated control of the cooking cycle/program. In addition, because the information about cooking cycle/programs/cycles and operator decisions/information is all stored, it is an easy matter to determine: (1) the use and wear of the cooking device; (2) the types of foods cooked and how many; (3) and errors in the process (e.g., errors in the "unload" step).

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All of the patents, patent publications and other references referred to above are incorporated herein by reference for all that they contain as if the contents thereof have been fully set forth verbatim herein.

What is claimed is:

1. An inspection system for providing a cooking cycle/program for food to be cooked in a cooking device, the cooking device including a cooking chamber having a plurality of vertically spaced-apart levels therein for placing food to be cooked, the inspection system comprising:
- a distance sensor;
- a digital optical recognition device;
- a controller having an associated memory;
- a plurality of cooking cycles/programs for each food to be cooked, wherein each of the plurality of cooking cycles/programs includes a plurality of cooking parameters selected from at least one of cooking time, cooking temperature, cooking with hot air, cooking with steam, or cooking with superheated steam, and wherein each of the plurality of cooking cycles/programs also includes each of the plurality of vertically spaced-apart levels as a cooking parameter; and
- images of food to be cooked stored in the associated memory,
  - wherein the distance sensor detects the vertically spaced-apart level where the food to be cooked is to be placed in the cooking chamber and stores the vertically-spaced apart cooking level in the associated memory,
  - wherein the digital optical recognition device captures images of the food to be cooked and stores the captured images in the associated memory,
  - wherein the controller accesses the captured images and stored images stored in the memory and compares the captured images to the stored images of food to be cooked,
  - wherein the controller identifies the food to be cooked based upon the comparison, and
  - wherein, based upon the stored vertically spaced-apart level and the identification of the food to be cooked, the controller selects a cooking cycle/program for the food to be cooked.

2. The inspection system according to claim 1, wherein the distance sensor and digital optical recognition device are disposed above an opening to the cooking chamber.

3. The inspection system according to claim 1, wherein the distance sensor is disposed below and digital optical recognition device is disposed above an opening to the cooking chamber.

4. The inspection system according to claim 1, wherein the distance sensor and digital optical recognition device are disposed in the cooking chamber.

5. The inspection system according to claim 1, wherein the digital optical recognition device comprises an electronic image sensor.

6. The inspection system according to claim 1, wherein the digital optical recognition device comprises a CCD sensor or a CMOS sensor.

7. The inspection system according to claim 1, wherein the digital optical recognition device further comprises an optical temperature sensor or IR sensor.

8. An inspection system for determining whether food cooked in a cooking device has been properly cooked, the cooking device including a cooking chamber having a plurality of vertically spaced-apart levels therein for holding cooking food, the inspection system comprising:
- a distance sensor;
- a digital optical recognition device;
- a controller and associated memory, wherein a vertically spaced-apart cooking level for each food cooking in the cooking chamber is stored in the associated memory: and
- images of properly cooked food stored in the associated memory,
  - wherein the distance sensor monitors the verticall spaced-apart level from which the cooked food is removed from the cooking chamber and stores the removed food level in the associated memory,
  - wherein the controller compares the removed food level to the cooking food level to determine if the correct cooked food is removed from the cooking chamber,
  - wherein the digital optical recognition device captures images of the cooked food removed from the cooking chamber and stores the captured images in the associated memory,
  - wherein the controller accesses the captured images and the stored images and compares the captured images to the stored images of cooked food, and
  - wherein the controller, based upon the comparison, whether the cooked food has been properly cooked.

9. The inspection system according to claim 8, further comprising a signal device, wherein the signal device provides a signal that cooked food can be removed from the cooking chamber.

10. The inspection system according to claim 9, further comprising a display, wherein the display indicates the identity of the cooked food to be removed from the cooking chamber and the level from which the cooked food is to be removed.

11. The inspection system according to claim 8, wherein, if the distance sensor determines that an incorrect food product is being removed from the cooking chamber, a warning device indicates that the incorrect cooked food is being removed.

12. The inspection system according to claim 11, wherein the warning device comprises a visual or audible indicator.

* * * * *